(12) United States Patent
Kramer

(10) Patent No.: US 10,598,289 B2
(45) Date of Patent: Mar. 24, 2020

(54) SPOOL VALVE

(71) Applicant: Walter Kramer, Hünenberg See (CH)

(72) Inventor: Walter Kramer, Hünenberg See (CH)

( * ) Notice: Subject to any disclaimer, the term of this patent is extended or adjusted under 35 U.S.C. 154(b) by 0 days.

(21) Appl. No.: 15/116,923

(22) PCT Filed: Feb. 6, 2015

(86) PCT No.: PCT/EP2015/000241
§ 371 (c)(1),
(2) Date: Aug. 5, 2016

(87) PCT Pub. No.: WO2015/124266
PCT Pub. Date: Aug. 27, 2015

(65) Prior Publication Data
US 2017/0159831 A1     Jun. 8, 2017

(30) Foreign Application Priority Data

Feb. 7, 2014   (DE) .......................... 10 2014 001 726

(51) Int. Cl.
*F16K 3/20*    (2006.01)
*F16K 3/10*    (2006.01)
*F16K 3/02*    (2006.01)

(52) U.S. Cl.
CPC .............. *F16K 3/207* (2013.01); *F16K 3/029* (2013.01); *F16K 3/10* (2013.01); *B65D 2590/542* (2013.01)

(58) Field of Classification Search
CPC .......... F16K 3/0236; F16K 3/20; F16K 3/207; F16K 3/10; F16K 3/312; F16K 3/04; B65D 90/587; B65D 2590/54; B65D 2590/542

USPC .......................... 251/175, 172, 193, 195, 196
See application file for complete search history.

(56) References Cited

U.S. PATENT DOCUMENTS

| 1,727,644 A | * | 9/1929 | Walter | ...................... F16K 3/10 |
| | | | | 138/94.5 |
| 2,214,959 A | * | 9/1940 | Hamer | ...................... F16K 3/20 |
| | | | | 138/44 |
| 2,914,294 A | * | 11/1959 | Beatty | ...................... F16K 3/207 |
| | | | | 137/852 |

(Continued)

FOREIGN PATENT DOCUMENTS

| CN | 202 674 352 | 1/2013 |
| DE | 298 08 336 | 10/1999 |

(Continued)

OTHER PUBLICATIONS

English translation of applicant cited document CN202674352 by Duan Baolin (referred in the Office Action as "Baolin") originally published on Jan. 16, 2013 (Year: 2013).*

*Primary Examiner* — Reinaldo Sanchez-Medina
*Assistant Examiner* — David Colon-Morales
(74) *Attorney, Agent, or Firm* — Gudrun E. Huckett

(57) ABSTRACT

The disclosed spool valve is used especially in conveying systems comprising conveying pipes (6, 7) and includes a spool (1) which allows the conveying cross-section of the conveying pipe (6, 7) to be closed. The spool (1) has at least one through-hole (33). The conveying pipe (6, 7) is sealed from the spool (1) by at least one sealing ring (27, 28). Said sealing ring (27, 28) surrounds the conveying line (6, 7) and includes a washer-shaped sealing portion. Said sealing portion lies flat on the spool and seals under the effect of the difference between the pressure in the conveying line (6, 7) and the ambient pressure.

24 Claims, 17 Drawing Sheets

(56) References Cited

U.S. PATENT DOCUMENTS

| | | | | |
|---|---|---|---|---|
| 3,110,470 | A | * | 11/1963 | Dumm .................. F16K 3/207 |
| | | | | 251/159 |
| 3,367,625 | A | | 2/1968 | Fortune |
| 3,659,822 | A | * | 5/1972 | Nagy ..................... F16K 3/312 |
| | | | | 138/94.5 |
| 3,765,647 | A | * | 10/1973 | Grove .................. F16K 3/0227 |
| | | | | 251/317 |
| 3,972,507 | A | * | 8/1976 | Grove .................. F16K 3/0227 |
| | | | | 251/172 |
| 3,999,522 | A | * | 12/1976 | Jaulmes .................. F02D 9/14 |
| | | | | 123/184.56 |
| 4,068,821 | A | | 1/1978 | Morrison |
| 4,161,309 | A | | 7/1979 | Klyce |
| 4,192,483 | A | * | 3/1980 | Combes ............... F16K 3/0227 |
| | | | | 251/172 |
| 4,471,943 | A | * | 9/1984 | Nelson .................... F16K 3/02 |
| | | | | 251/327 |
| 4,509,717 | A | * | 4/1985 | Wright ................ B65D 90/587 |
| | | | | 251/144 |
| 4,577,834 | A | * | 3/1986 | Oliver .................... F16K 3/207 |
| | | | | 251/175 |
| 4,643,395 | A | * | 2/1987 | Williams, Jr. ......... F16K 3/0236 |
| | | | | 251/172 |
| 5,192,051 | A | * | 3/1993 | Roberson ............. F16K 3/0236 |
| | | | | 251/328 |
| 5,211,373 | A | * | 5/1993 | Baker .................... F16K 3/186 |
| | | | | 251/196 |
| 5,366,199 | A | * | 11/1994 | Isoyama ............... F16K 3/0227 |
| | | | | 251/174 |
| 5,927,684 | A | * | 7/1999 | Marx ........................ F16K 3/20 |
| | | | | 251/195 |
| 7,114,702 | B2 | * | 10/2006 | Sauer .................... F16K 3/0281 |
| | | | | 251/195 |
| 9,759,334 | B2 | * | 9/2017 | Hunter .................. F16K 3/0227 |
| 2012/0256113 | A1 | * | 10/2012 | Comeaux ............. F16K 3/0227 |
| | | | | 251/328 |

FOREIGN PATENT DOCUMENTS

| | | |
|---|---|---|
| DE | 20 2005 005 483 | 7/2005 |
| GB | 1 572 389 | 7/1980 |
| JP | 50-113137 | 1/1975 |
| JP | H11-63249 | 3/1999 |
| WO | 01/44702 | 6/2001 |

* cited by examiner

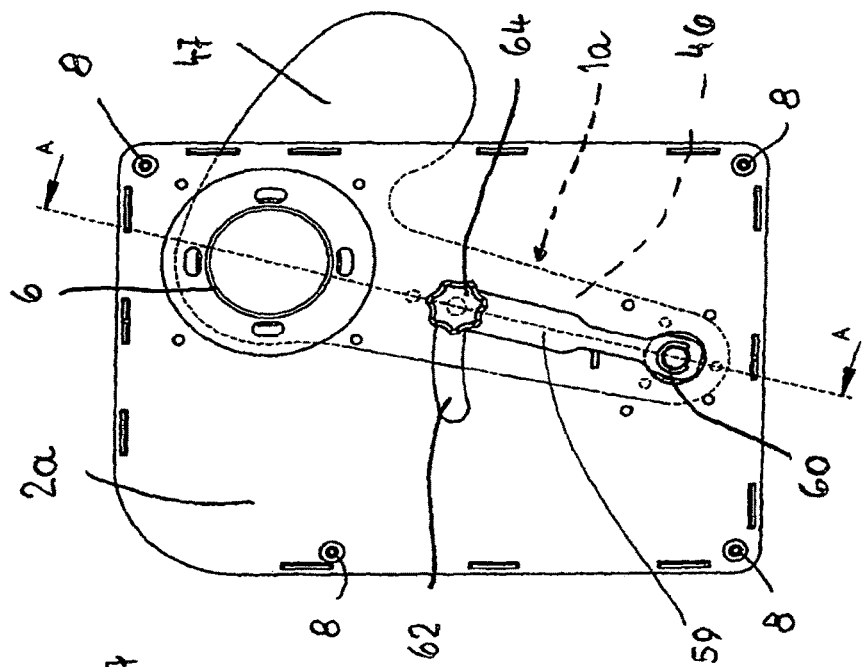
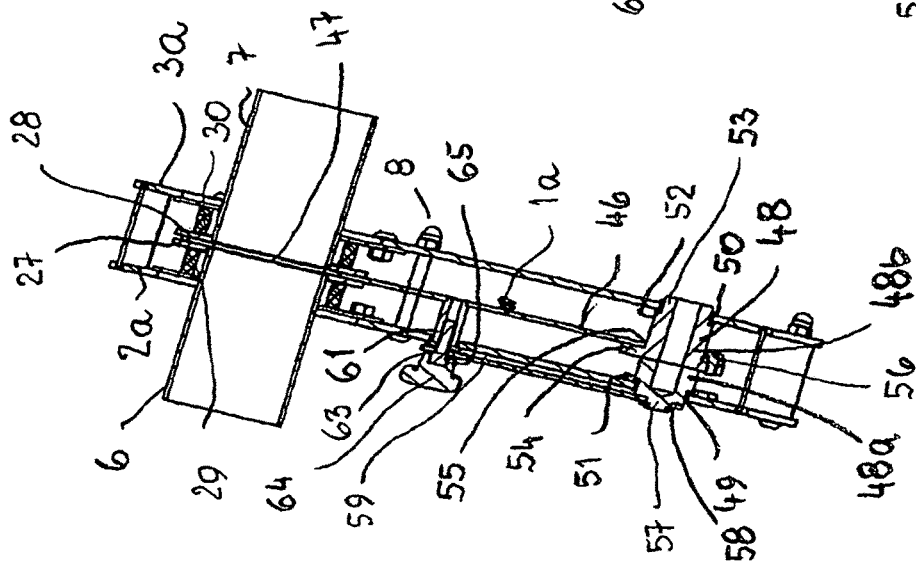

SPOOL VALVE

BACKGROUND OF THE INVENTION

The invention relates to a spool valve in particular for use in conveying systems with conveying lines, with at least one slide, with which the conveying cross section of the conveying line can be closed off and which comprises at least one passage opening, and with at least one sealing ring, with which the conveying line is sealed against the slide.

It is known to open or close conveying lines, through which a material such as for example a plastic granulate is pneumatically conveyed using spool valves. For this purpose, a slide is provided which is shifted from a closing position into an opening position, in which a passage opening provided in the slide makes possible the material to be conveyed passing through the conveying line. The material to be conveyed is conveyed through the conveying line using vacuum or pressure. For this reason, the passage region of the slide through the conveying line has to be sealed. It is known to provide a seal on the edge of the passage opening which in the opening position of the slide seals the sealing gap between the slide and the conveying line.

The invention is based on the object of embodying the spool valve of the aforementioned kind such that it ensures secure sealing with a simple design and cost effective configuration while the slide, during conveying breaks, that is in the pressureless state, can be easily shifted between the closing position and the opening position.

SUMMARY OF THE INVENTION

According to the invention, this object in regard to the slide valve of the aforementioned kind is solved in that the sealing ring surrounds the conveying line and comprises a washer-like sealing part which lies flat against the slide and seals through the pressure differential between the pressure in the conveying lines and the ambient pressure.

In the slide valve according to the invention, the sealing ring surrounds the conveying line and, with a washer-like sealing part lies flat against the slide. The flat washer-like sealing part utilises only little installation space and can be easily mounted. To achieve the seal, a pressure force acts on the washer-like sealing part, by way of which the sealing part is pressed against the slide. The pressure force is generated through the pressure differential between the pressure in the conveying line and the ambient pressure. When conveying in the conveying line takes place under vacuum, a negative pressure is present in the conveying line. Then, the washer-like sealing part is pressed against the slide by the external pressure outside the conveying line as a result of which the seal is achieved. When the material to be conveyed is conveyed through the conveying line by means of pressure that is higher than the ambient pressure, the annual disc-shaped sealing part is pressed against the slide through the pressure which acts in the conveying line.

In a preferred embodiment, the slide valve comprises two retaining plates, between which the slide is arranged. The retaining plates each are spaced from the slide so that they cannot impair the shiftability of the slide.

In a preferred embodiment, a sealing ring each with a washer-like sealing part lies against both sides of the flat slide. These flat sealing parts each lie flat against the two slide sides under pressure force. Because of this, optimal sealing is ensured.

Advantageously, the two retaining plates are held spaced from one another by way of spacers. These spacers are designed so that they penetrate slots in the slide which extend in the shifting direction of the slide. Thus, the spacers additionally serve also for guiding the slide in its shifting direction.

Advantageously, at least the one retaining plate comprises at least one pipe section. Preferably, both retaining plates are each provided with at least one pipe section. The pipe sections are part of the conveying line. The pipe sections are connected to the respective retaining plate in a fixed manner, preferentially welded to the same, and project through an opening of the retaining plate. The slide extends between the facing ends of the pipe sections of the two retaining plates, wherein the sealing ring seals the annular gap between the respective pipe section and the slide.

In an advantageous embodiment, the sealing ring is held in its installation position through at least one positioning ring.

Advantageously, the positioning ring has a circular cross section. Because of this, it lies on the flat sealing part of the sealing ring only linearly, so that the slide can be easily shifted between the opening position and the closing position.

In an advantageous configuration, the sealing ring has an L-shaped cross section. Such a design of the sealing ring is employed in particular when the material to be conveyed is conveyed in the conveying line by means of pressure. The one leg of this sealing ring forms the flat washer-like sealing part which lies flat against the slide.

The other leg of the sealing ring comprising the L-shaped cross section runs cylindrically, wherein the cylinder axis coincides with the axis of the pipe sections. With its outer cylindrical surface, this cylindrical leg lies against the inside of a support ring surrounding the sealing ring. Because of this, the sealing ring is perfectly supported by the support ring radially to the outside.

It is advantageous when the one flat leg of the sealing ring is radially spaced from the pipe section. Then, the pressure, which is present in the conveying line in the case of pressure conveying, can enter the region between the pipe section and the cylindrical part of the sealing ring by way of the annular gap between the pipe section and the slide. Under this pressure, this cylindrical sealing ring part is firmly pressed against the inside of the support ring as a result of which optimal sealing is ensured.

Advantageously, the sealing ring comprises a receiving space for a pressure medium surrounding the pipe section. Because of this, the two legs of the sealing ring are pressed against the slide and the support ring so that reliable sealing of the conveying line or its pipe sections in the region of the slide is achieved.

This pressure space is delimited in axial direction of the pipe section by the one flat leg of the sealing ring or by the slide and the retaining plate and in radial direction by the pipe section and the support ring or the other, cylindrical leg of the sealing ring.

The support ring extends between the slide and the adjacent retaining plate. By way of the cylindrical leg of the sealing ring it is prevented that the pressure that is present in the receiving space can be removed via the gap between the support ring and the slide or the retaining plate.

In the case of pressure conveying, the pressure that is present in the receiving space is sufficient to reliably seal the conveying line or its pipe sections. The conveying pressure acts via the gaps between the pipe sections and the slide in the receiving space.

It is advantageous when in the receiving space of the sealing rings a positioning ring is accommodated, which prevents the sealing rings lifting off the slide in the pressureless state.

In order for the pressure to also reach the cylindrical leg of the sealing ring, the positioning ring for the pressure medium is designed permeably. Advantageously, the positioning ring comprises at least one passage for the pressure medium via which the pressure can also reach this cylindrical leg. Advantageously, the positioning ring is provided with multiple annular grooves which are preferentially arranged evenly distributed over the circumference of the positioning ring, via which the pressure can act on the cylindrical leg of the sealing ring.

The slide valve can be designed so that the material to be conveyed can be optionally directed with a feed line into at least two conveying lines that are separated from one another. In this case, the one retaining plate is provided with at least two pipe sections which in shifting direction of the slide are located spaced one behind the other, which are parts of two separate conveying lines. The slide is provided with a pipe section, to which the feed line of the material to be conveyed is connected. By shifting the slide, its pipe section can be optionally connected to one of the pipe sections of the retaining plate. The other pipe section is closed off by the slide so that the material to be conveyed can only be conveyed via the pipe sections which are connected to one another.

Such a design also makes it possible to feed the material to be conveyed to a recipient via the pipe section that is connected to the slide. The material to be conveyed in this case is fed via one of the pipe sections of the retaining plate.

In an advantageous and simple embodiment, the slide is pivotably mounted between the two retaining plates. Such an embodiment results in a highly compact design of the slide valve.

Here, the slide is advantageously formed approximately L-shaped.

Preferably, the slide, with its longer leg, is pivotably mounted between the two retaining plates.

To ensure that the slide can be easily pivoted, it is provided with at least one actuating part. With the latter, the user of the slide valve can very easily pivot the slide into the opening position and into the closing position.

Since the slide is located between the two retaining plates a slot is provided at least in the one retaining plate through which the actuating part projects. Because of this, the slide can be easily adjusted from the outside by the user. The slot is curved about the pivot axis of the slide.

Advantageously, the slot is so long that the opening position and the closing position of the slide are defined by the two ends of the slot lying in pivot direction. Thus, the user has to move the actuating part only so far until it comes to bear against the one or other end of the slot.

In order to ensure that the slide in the opening position or in the closing position is reliably secured in position it is advantageously provided to provide the actuating part with a clamping element, preferentially a rotary handle.

In an advantageous embodiment, the rotary handle is securely provided with a threaded pin, which can be screwed into a threaded bush that is securely connected to the slide. In the locking position, the threaded pin is screwed into the threaded bush so far that the clamping element clampingly bears against the retaining plate.

The subject of the application is not only obtained from the subject of the individual patent claims but also by all information and features disclosed in the drawings and in the description. These are claimed as being substantial to the invention even if they are not subject of the claims provided they are new with respect to the prior art individually or combined.

Further features of the invention are obtained from the further claims, the description and the drawings.

BRIEF DESCRIPTION OF THE DRAWINGS

The invention is explained in more detail by way of three embodiments shown in the drawings.

It is shown in

DESCRIPTION OF PREFERRED EMBODIMENTS

Figure 1:
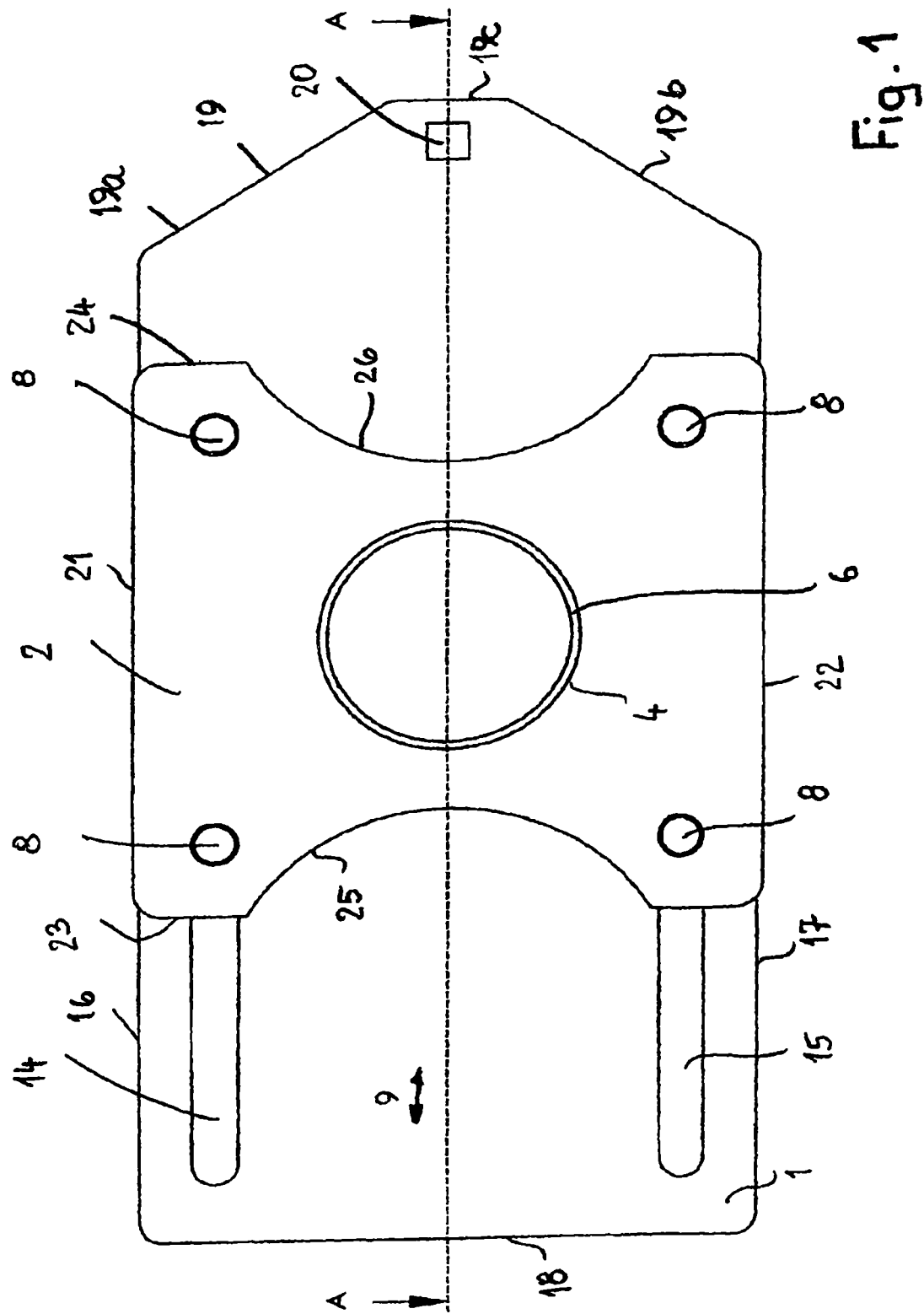
FIG. 1 a slide valve according to the invention in top view.

The slide valve according to FIG. 1 to 5 is employed with vacuum conveying. It has a flat slide 1, which lies between two retaining plates 2, 3. Each of these lie spaced from the slide 1 and each have an opening 3, 5 through which a pipe section 6, 7 each projects. The two pipe sections 6, 7 lie aligned with one another and have same inner and outer diameters. To the pipe sections 6, 7, conveying lines are connected in the known manner through which a material to be conveyed, such as a plastic granulate, is conveyed. With the slide 1, the inner cross section of the pipe sections 6, 7 can be closed so that no material can flow through the relevant conveying lines any longer. The pipe sections 6, 7 are advantageously securely connected to the retaining plates 2, 3 by welding.

The two retaining plates 2, 3 are held at the necessary spacing relative to one another by spacers 8. In the exemplary embodiment, four spacers 8 are provided of which in each case two spacers are located spaced one behind the other in shifting direction 9 of the slide 1.

The spacers 8 are designed identically and each have a screw 10, with which the spacing between the two retaining plates 2, 3 can be adjusted. Manufacturing tolerances can thus be easily compensated without machining of the relevant parts being required. The retaining plate 3 is locked by a lock nut 11, which sits on the screw 10. The screw 10, over a part of its length, is surrounded by a guide bush 12 which, on the screw 10, is axially locked on the screw 10 through a further lock nut 13. With its other end, the guide bush 12 lies against the inside of the retaining plate 2 facing the retaining plate 3. The guide bushes 12 of each spacer 8 project through a slot 14, 15 extending in shifting direction 9 of the slide 1. The slide 1 has an approximately rectangular outline with longitudinal sides 16, 17 which extend parallel to one another and to the shifting direction 9 and narrow sides 18, 19. The narrow side 18 lies perpendicularly to the longitudinal sides 16, 17 and straight in extent. The opposite narrow side 19 has edge sections 19a, 19b which from the longitudinal sides 18, 17 convergingly extend to one another, which merge into one another by way of a straight short edge section 19c extending parallel to the narrow side 18. Because of this configuration, the slide 1 tapers at this end, at which at least one hooking-in opening 20 is located, in which an actuation element for the slide 1 can be fastened, for example hooked in. The two slots 14, 15 lie next to the longitudinal sides 16, 17 of the slide 1 only with minor spacing. Two guide bushes 12 each project into the two slots 14, 15, which guide bushes 12 lie spaced one behind the other in shifting direction 9.

As shown by FIG. 1, the two retaining plates 2, 3 likewise have two longitudinal sides 21, 22 which are straight in extent, which in top view of the slide valve slightly protrude over the longitudinal sides 16, 17 of the slide 1. In the edges 23, 24 connecting the longitudinal sides 21, 22 a semi-circular recess 25, 26 each is located at half the length. The pipe sections 6, 7 lie in the middle with respect to the retaining plates 2, 3.

The described outline of the slide 1 and of the retaining plates 2, 3 must not be seen restrictively. The slide 1 and the retaining plates 2, 3 can obviously have any other suitable outline.

The pipe sections 6, 7 are each surrounded by a flat sealing ring 27, 28, which sealingly lie against the circumference of the pipe sections 6, 7 and are supported (FIG. 2) on both sides of the slide 1. The sealing rings 27, 28 have same outer diameters and consist of material that is suitable for the respective application, for example silicone, polytetrafluoroethylene and the like. These sealing rings can be temperature-resistant, acid-resistant, resistant to aggressive vapours and the like. The material of the sealing rings is selected as a function of the material to be conveyed and/or the ambient conditions of the slide valve. The sealing rings 27, 28 are supported flat over the circumference and their radial width on the two sides of the slide 1.

Figure 4:
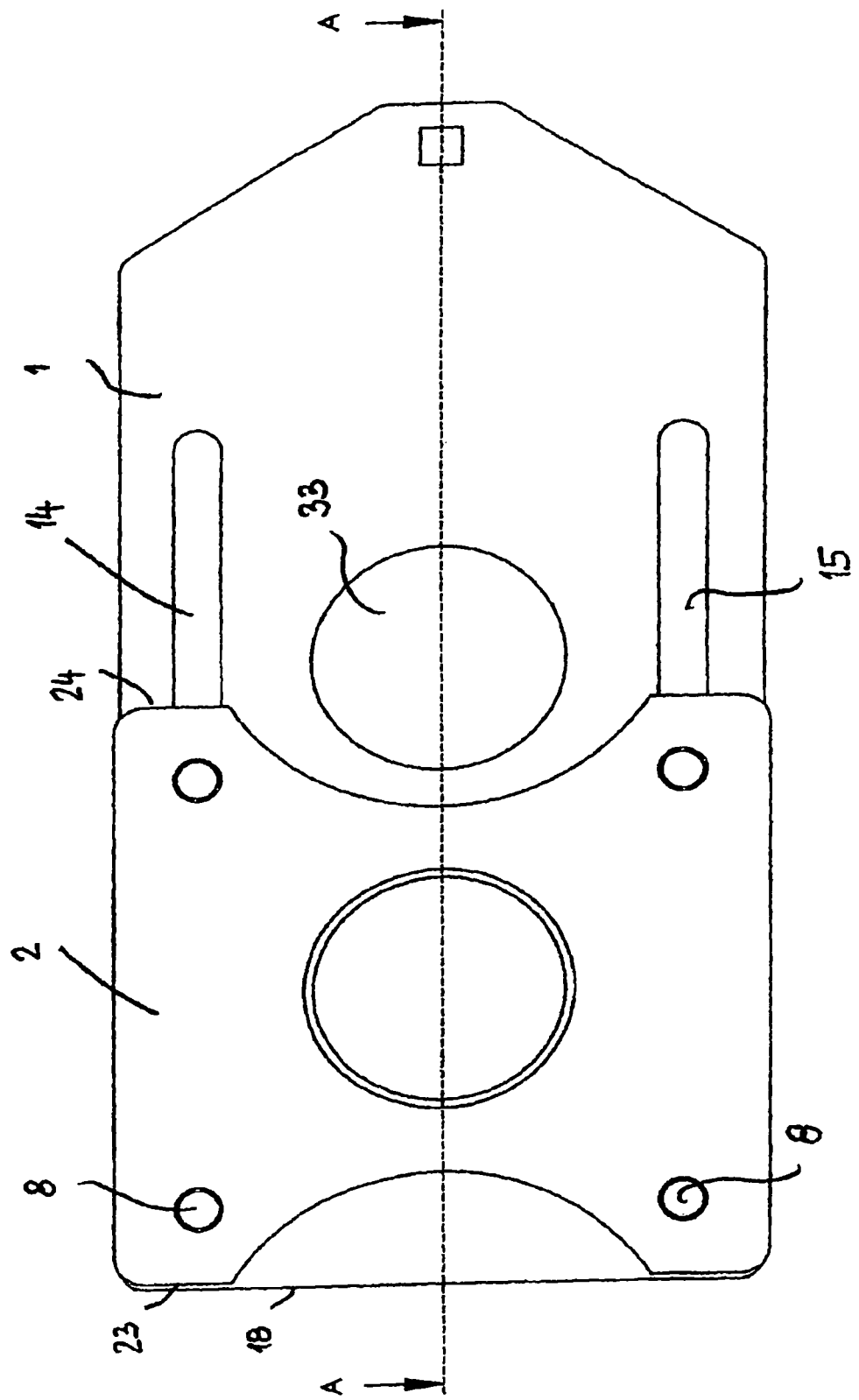
FIG. 4 in a representation corresponding to FIG. 1, the slide valve according to the invention, the slide of which is shifted into another end position, FIG. 5 a section along the line A-A in FIG. 4, FIG. 6 a top view of a second embodiment of a slide valve according to the invention, FIG. 7 a section along the line A-A in FIG. 6, FIG. 8 the slide valve according to FIG. 6, slide of which is shifted into another end position, FIG. 9 a section along the line. A-A in FIG. 8, FIG. 10 the detail X in FIG. 9 in enlarged representation, FIG. 11 a top view of a third embodiment of a slide valve according to the invention, FIG. 12 a section along the line A-A in FIG. 11, FIG. 13 a view in direction of the arrow XIII in FIG. 11, FIG. 14 the slide valve according to FIG. 11 in perspective representation, FIG. 15 a view in direction of the arrow XV in FIG. 11, FIG. 16 a further embodiment of a slide valve according to the invention in view, the slide of which assumes a closing position, FIG. 17 the slide valve according to FIG. 16, the slide of which assumes the opening position, FIG. 18 a section along the line A-A in FIG. 17.
Figure 5:
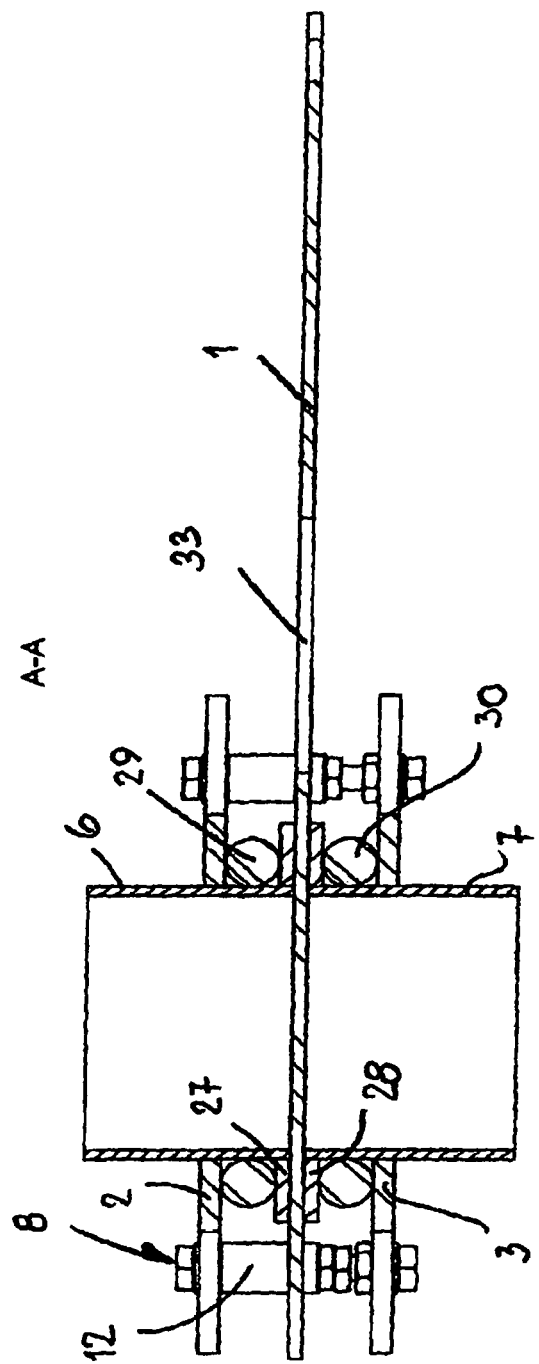

Between the sealing rings 27, 28 and the two retaining plates 2, 3 a positioning ring 29, 30 each is arranged. These have a circular cross section and consist of air-permeable material, of elastomer material such as rubber, rubber-like materials, of EPDM and the like. The two positioning rings 29, 30 lie against the circumference of the pipe sections 6, 7 and ensure that the sealing rings 27, 28 do not lift off the slide 1. The sealing rings 27, 28 are loosely supported by the slide 1. It is thereby ensured that the slide 1 can be easily shifted between the opening position (FIG. 1 to 3) and the closing position (FIGS. 4 and 5).

The slide 1 extends between the two pipe sections 6, 7, whose face ends 31, 32 facing one another each form an annular gap 66, 67 (FIG. 3) with the two sides of the slide 1. It is shown enlarged in FIG. 3. The sealing rings 27, 28 seal the gaps 66, 67 between the pipe sections 6, 7 and the slide 1, which because of the annular gap 66, 67, is contactlessly shiftable.

In the case of the vacuum conveying of the material to be conveyed the force which acts on the disc shaped sealing rings 27, 28 is determined by the pressure differential between the pressure in the pipe sections 6, 7 and the ambient pressure. The greater this pressure differential is the greater is the force that acts on the sealing rings 27, 28. Because of this it is ensured that no ambient air can enter the pipe sections 6, 7 via the gap between the slide 1 and the pipe sections 6, 7.

The positioning rings 29, 30 are designed so that the pressure differential can act on the sealing rings 27, 28. With the retaining plates 2, 3 and the spacers 8, the gap 66, 67 between the slide 1 and the pipe sections 6, 7 can be sensitively and precisely adjusted.

When the manufacturing tolerances permit that the gaps 66, 67 between the pipe sections 6, 7 and the slide 1 are sufficiently small, an adjusting device as provided in the exemplary embodiment is not necessary. The positioning rings 29, 30 ensure that the sealing rings 27, 28 do not move away from the slide 1 in the pressureless state. If this were the case, the self attraction of the sealing rings 27, 28 during the vacuum conveying according to the principle of a non-return valve would no longer be ensured since the low airflow rate that can pass through the gaps 66, 67 between the pipe sections 6, 7 and the slide 1 is so low that the sealing rings 27, 28 would no longer be attracted on account of the described pressure differential.

The positioning rings 29, 30 can exemplarily consist of air-permeable material, for example of open-pore foam material.

Figure 2:
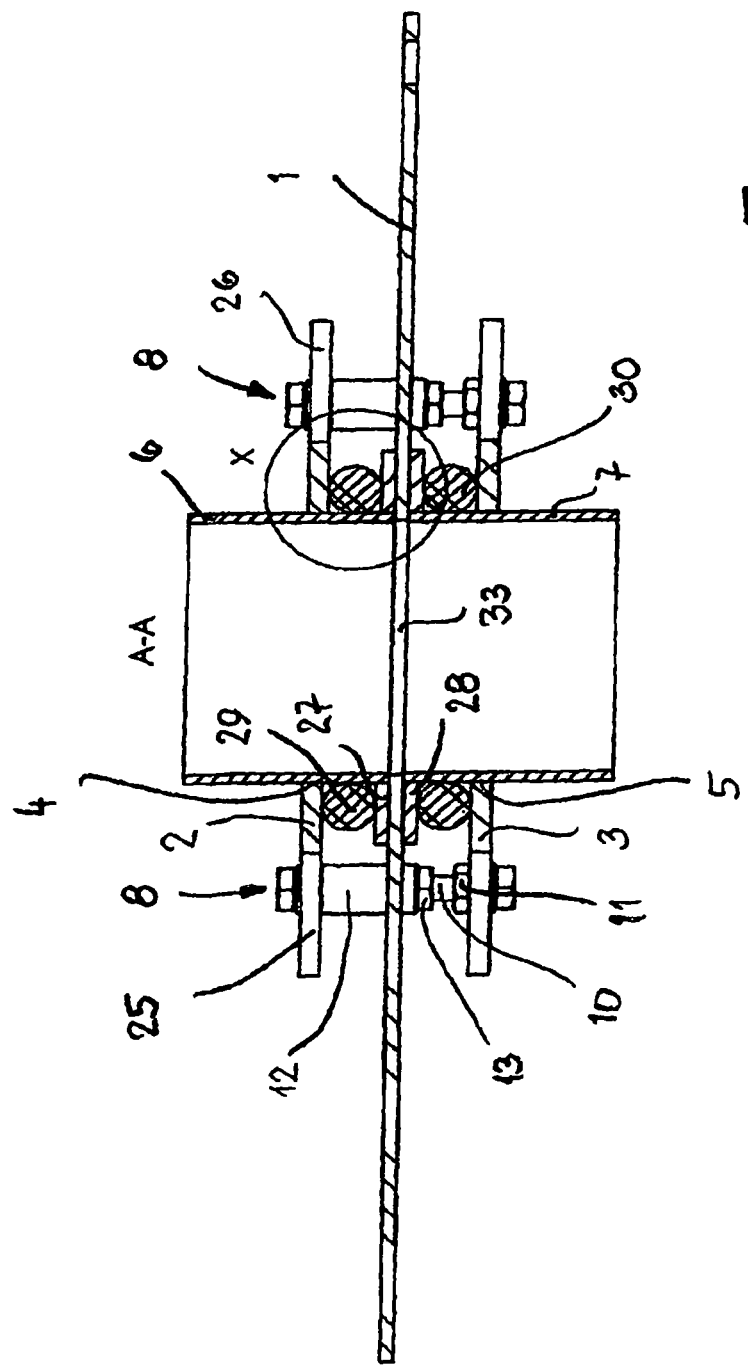
FIG. 2 a section along the line A-A in FIG. 1.
Figure 3:
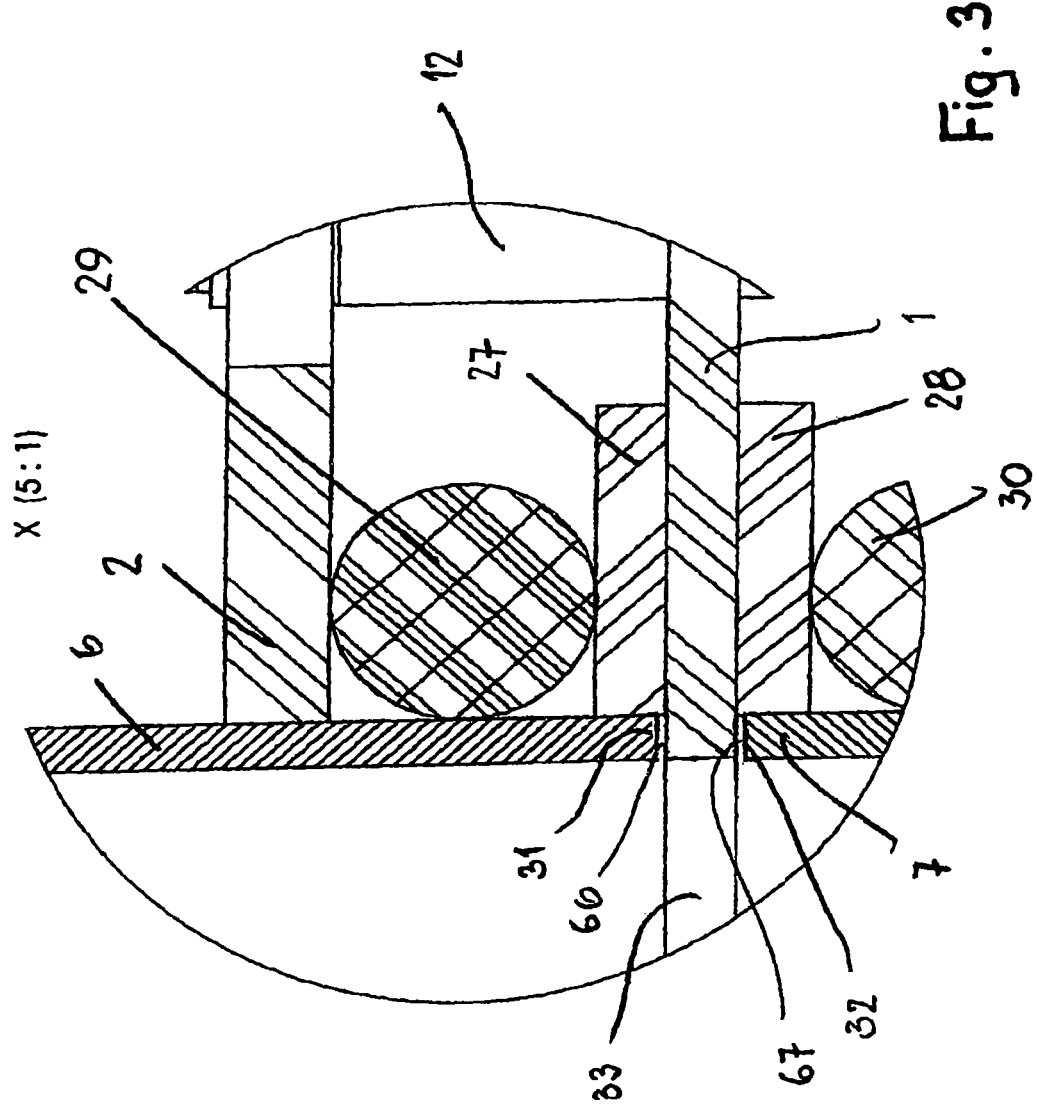
FIG. 3 in enlarged representation the detail X in FIG. 2.

In the opening position shown in FIG. 1 to 3, the opening cross section of the pipe sections 6, 7 is opened by the slide 1, which comprises a passage opening 33, the diameter of which is equal to the inner diameter of the two pipe sections 6, 7. In this open position of the slide 1, the spacers 8 on the right in FIG. 1 lie with their guide bushes 12 against the adjacent end, of the slots 14, 15 of the slide 1.

When the passage through the pipe sections 6, 7 is to be closed, the slide 1 is shifted in shifting direction 9 to the right. In the closing position of the slide 1, the guide bushes 12 of the two spacers 8 on the left in FIG. 1 advantageously lie against the in FIG. 1 left end of the slots 14, 15. The slide 1 can be easily shifted since the positioning rings 29, 30 do not exert any or at most only a minimal pressure on the sealing rings 27, 28 which are rectangular in cross section, so that the pressure force on the slide 1 is low. Through the outside pressure acting on the sealing rings 27, 28 perfect sealing between the pipe sections 6, 7 and the slide 1 is ensured.

In shifting direction 9 of the slide 1, the retaining plates 2, 3 are shorter than the slide 1, which in both end positions (FIGS. 1 and 4) protrudes at least over an edge 23, 24 of the retaining plates 2, 3. In the opening position according to FIG. 1, the slide 1 projects over both edges 23, 24 of the retaining plates 2, 3, which in top view are congruently arranged on top of one another. In the closing position according to FIG. 4, the narrow side 18 of the slide 1 lies approximately at the height of the edge 23 of the retaining plates 2, 3 while the slide 1 protrudes in shifting direction over the opposite edge 24 of the retaining plates 2, 3 by a corresponding amount. In the closing position, the passage opening 33 of the slide 1 lies in the region next to the retaining plates 2, 3 (FIG. 4).

According to FIG. 6 to 10, the slide valve is employed with a pressure conveying of the material. The slide 1 and the retaining plates 2, 3 as well as their connection to one another by means of the spacers 8 is designed equivalent to that in the previous embodiment.

Figure 10:
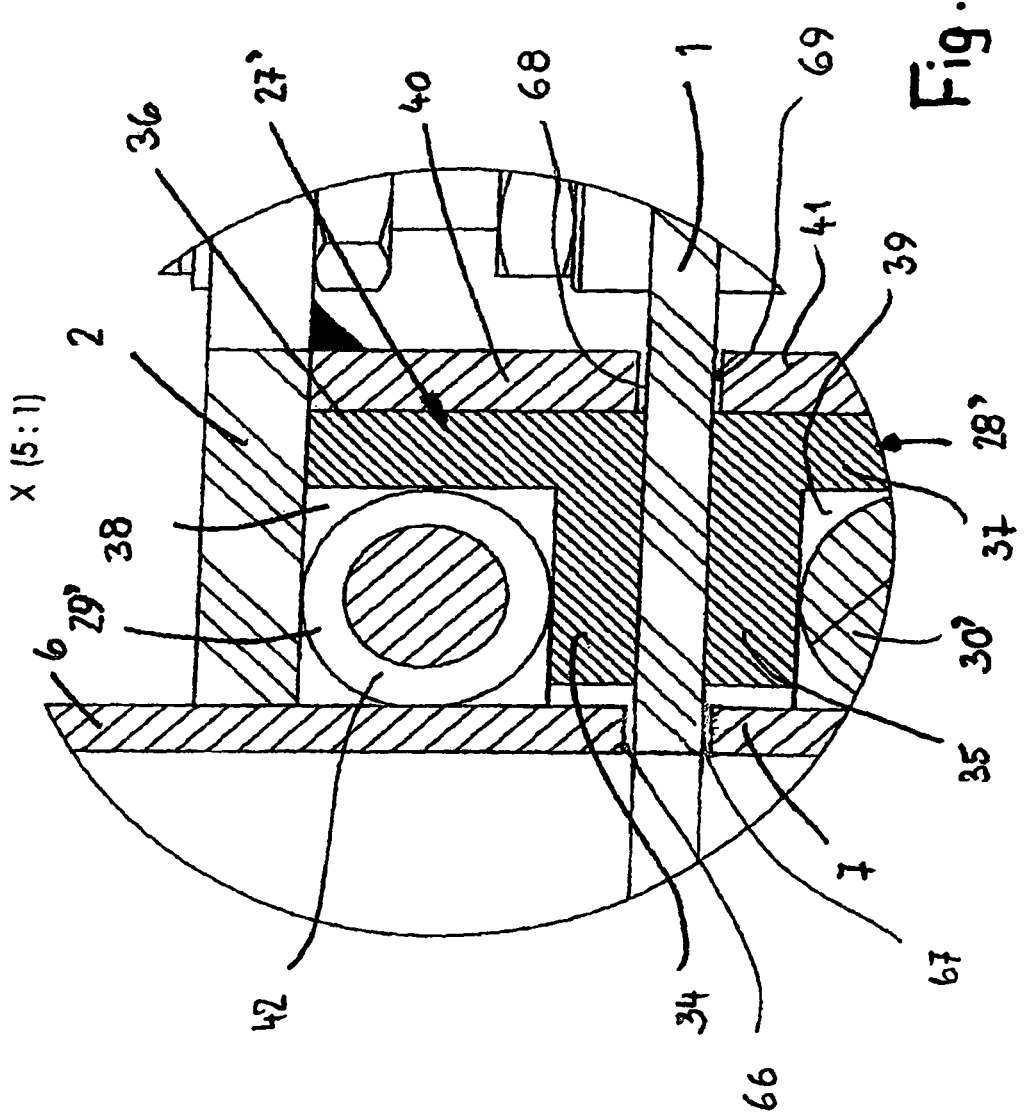

The sealing rings 27', 28' have an L-shaped cross section and surround the two pipe sections 6, 7 with minor radial spacing (FIG. 10). With their one leg 34, 35, the two sealing rings 27', 28' are sealingly supported on the two sides of the slide 1. The two legs 34, 35 are washer-like in design and perpendicularly follow the legs 36, 37 which, spaced, surround the pipe sections 6, 7 and in each case form a cylindrical ring, the axis of which coincides with the axis of the pipe sections 6, 7. The legs 34, 35; 36, 37 each delimit an annular receiving space 38, 39 in which the positioning rings 29', 30' are accommodated.

The two sealing rings 27', 28' are each surrounded by a support ring 40, 41, which extends between the retaining plates 2, 3 and against the inside of which the legs 36, 37 of the sealing rings 27', 28' sealingly lie. The support rings 40, 41 are securely connected to the retaining plates 2, 3, preferentially welded to these. Between the slide 1 and the support rings 40, 41 an annular gap 68, 69 each exists so that the slide can be contactlessly shifted also in the region of the support rings 40, 41.

Since the washer-like legs 34, 35 surround the pipe sections 6, 7 with radial spacing, the pressure acting in the pipe sections 6, 7 in the case of pressure conveying also acts in the receiving spaces 38, 39 via the gaps 66, 67 between the pipe sections 6, 7 and the slide 1. This results in that through this pressure in the receiving space 38, 39 the washer-like legs 34, 35 of the sealing rings 27', 28' are pressed against the two sides of the slide 1 as a result of which a reliable sealing between the legs 34, 35 and the slide is achieved. Because of this pressure in the receiving spaces 38, 39, the positioning rings 29', 30' are not absolutely necessary. The positioning rings 29', 30' however have the advantage that a pressure acts on the washer-like legs 34, 35 of the sealing rings 27', 28' even when in the pipe sections 6, 7 no pressure has yet been built up. Then, the positioning rings 29', 30' ensure the contact pressure of the legs 35 of the sealing rings 27', 28' on the slide 1 that is necessary for sealing. For this case, the positioning rings 29', 30' are designed so that they lie against the legs 34, 36; 35, 37 of the sealing rings 27', 28' subject to elastic deformation.

In addition to this, the use of the positioning rings 29', 30' has the advantage that even with manufacturing tolerances of the sealing rings 27', 28' and/or of the support rings 40, 41, perfect sealing is ensured.

The support rings 40, 41 are connected to the retaining plates 2, 3 in a tightly sealed manner and consist of metallic material such as steal. The sealing rings 27', 28' consist of the same material as the sealing rings 27, 28 of the previous embodiments.

The positioning rings 29', 30' are provided with at least one annular groove 42 (FIG. 10), through which it is ensured that the pressure that is created during the pressure conveying can act on the legs 36, 37 of the two positioning rings 29', 30'. Advantageously, multiple such annular grooves 42 are present over the circumference of the positioning rings 29', 30' which are circular in cross section. The positioning rings 29', 30 can also consist of air-permeable material such as foamed material.

When for pressure conveying higher pressures are employed, annular coil springs are used as positioning rings 29', 30' if these are provided, which exert an adequate pressure on the two legs 34, 35; 36, 37 of the sealing rings 27', 28'.

Since in the pipe sections 6, 7 the material to be conveyed is conveyed by means of pressure which is higher than the ambient pressure, the positioning rings 29', 30' are not absolutely essential. The higher the pressure in the pipe sections 6, 7 is, the greater the sealing rings 27', 28' are loaded. Accordingly, the legs 34, 35 of the sealing rings 27', 28' press onto the two sides of the slide 1 so that no air can escape from the receiving spaces 38, 39. The positioning rings 29', 30' have the advantage that the sealing rings 27', 28' are under sealing force even when no conveying in the pipe sections 6, 7 takes place and accordingly no pressure built up yet in the pipe sections.

Figure 6:
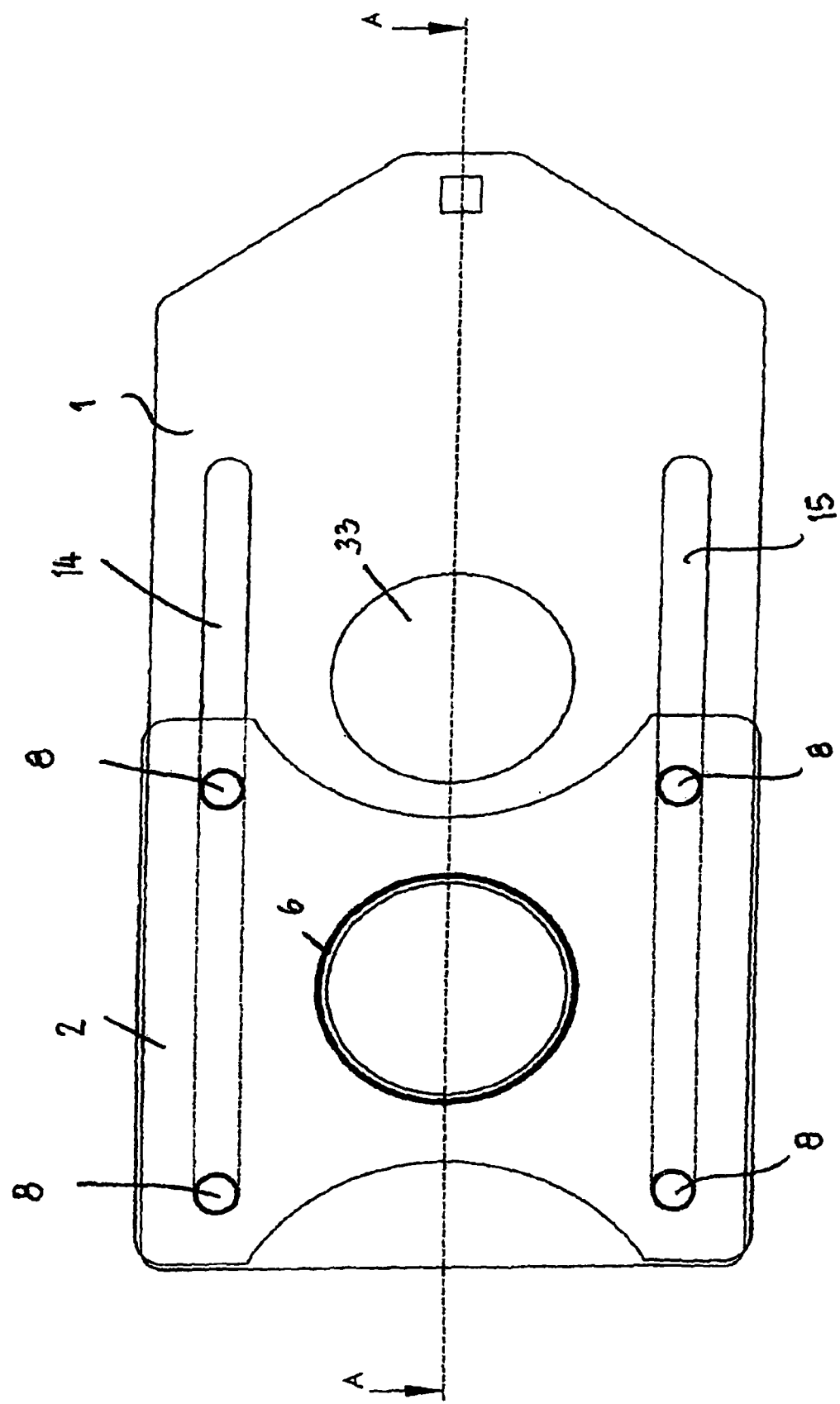
Figure 7:
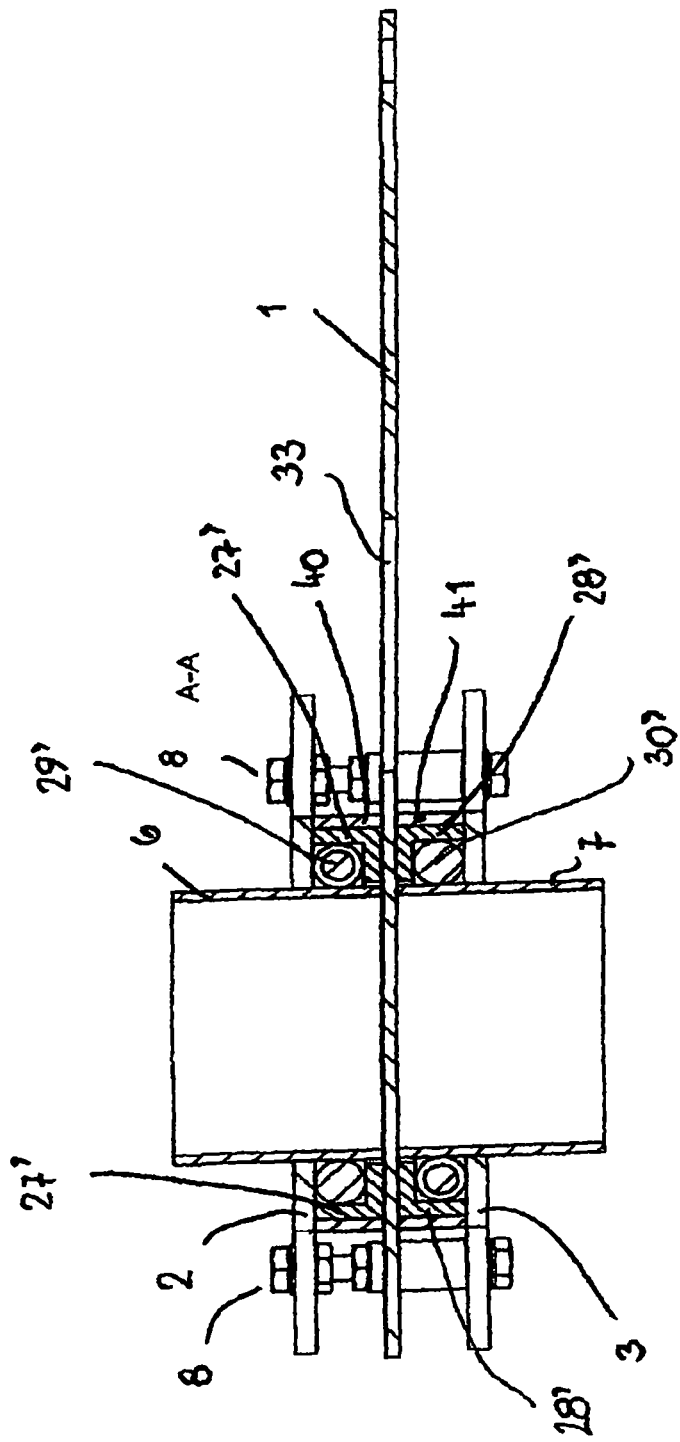

In the position according to FIG. 6 the slide 1 is in the closing position, in which the passage opening 33 is located in the region next to the two retaining plates 2, 3. The passage through the pipe sections 6, 7 is thus closed. The in FIG. 6 left spacers 8 lie with their guide bushes 12 against the in FIG. 6 left end of the two slots 14, 15.

Figure 8:
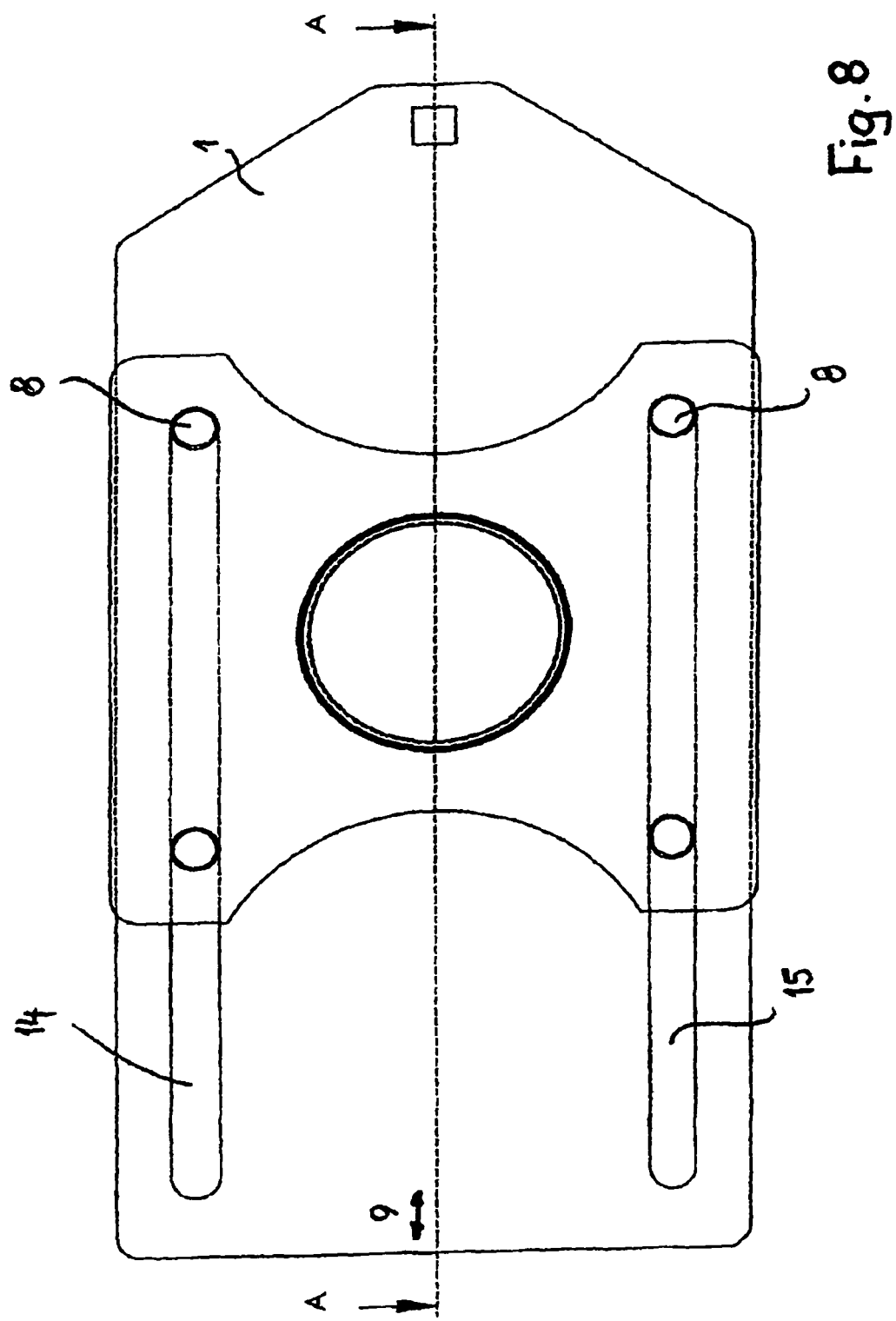
Figure 9:
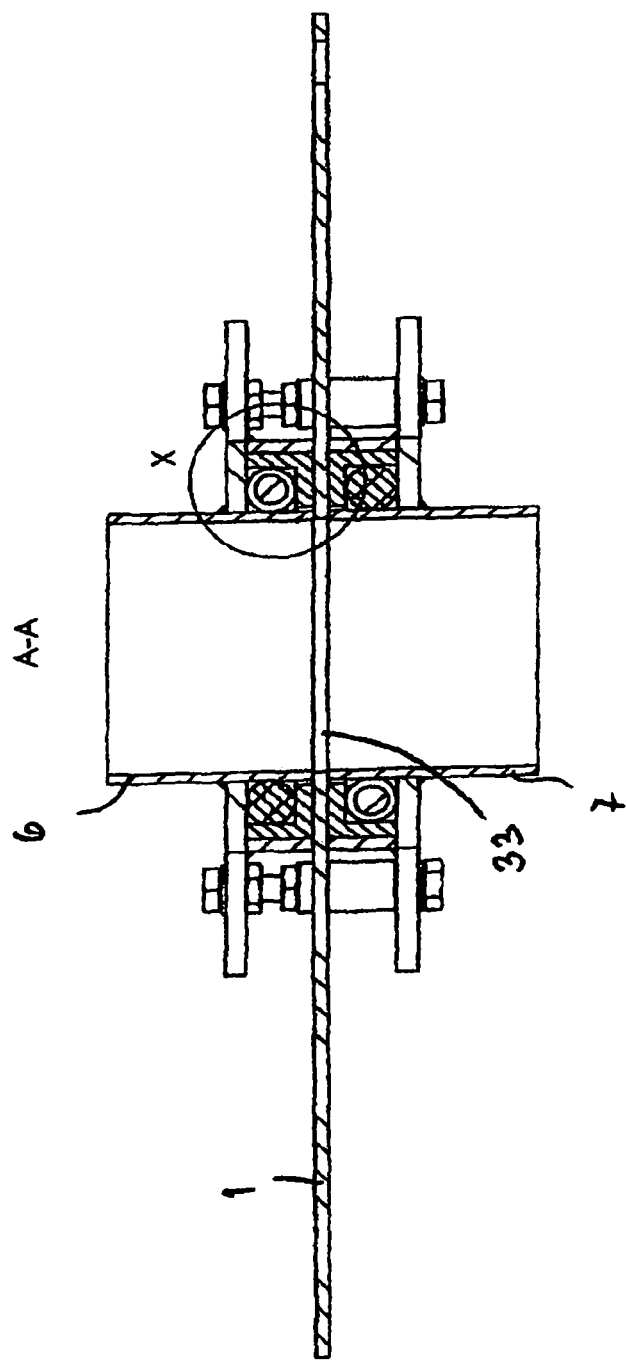

In FIG. 8, the slide 1 is shifted in shifting direction 9 so far to the left that the passage opening 33 opens the passage through the pipe sections 6, 7. This opening position is advantageously achieved in that the in FIG. 8 right spacers 8 lie against the right end of the slots 14, 15 of the slide.

FIGS. 11 to 15 show a slide valve the retaining plate 2 of which is provided with two pipe sections 6, 6', which in shifting direction 9 of the slide 1 are located spaced one behind the other. The opposite retaining plate 3 comprises an elongated opening 43 at half the width (FIG. 11), through which the pipe section 7 projects, which is securely connected to the slide 1. With the slide 1, the pipe section 7 can be shifted so that it is aligned either with the pipe section 6 or with the pipe section 6'. Because of this it is possible to optionally convey the material to be conveyed through the pipe section 6 or the pipe section 6' and the respective line connected thereto.

The two pipe sections 6, 6' are securely connected to the retaining plate 2, preferentially by welding. Both pipe sections 6, 6' are surrounded in the region between the retaining plate 2 and the slide 1 corresponding to the previous embodiment by a sealing ring 27' and a positioning ring 29' each. The sealing rings 27' are surrounded by the support rings 40. The design and arrangement of these rings 27', 29', 40 entirely corresponds to the previous embodiment.

The slide 1 is designed identically to that in the exemplary embodiment according to FIG. 1 to 5 and on its longitudinal sides comprises the two slots 14, 15 through which the spacer 8 project in the described manner. The pipe section 7, which is securely connected to the slide 1 for example through welding, projects through the opening 43 of the retaining plate 3 to the outside. The conveying line that is connected to the pipe section 7 can be optionally connected with the help of the slide 1 to the pipe section 6' or to the conveying line that is connected to the pipe section 6. The inner cross section of the pipe sections 6, 6', 7 is identical, so that conveying of the respective material through the pipe sections is ensured without problem.

The connection of the retaining plates 2, 3 to one another and to the slide 1 is formed identically as with the previous exemplary embodiments.

Figure 11:
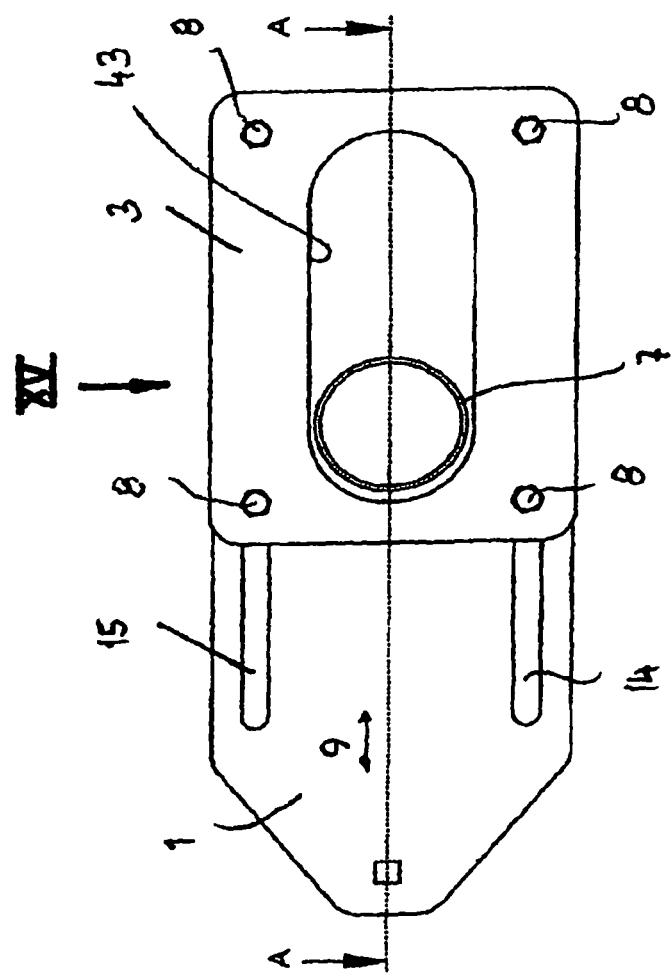
Figure 12:
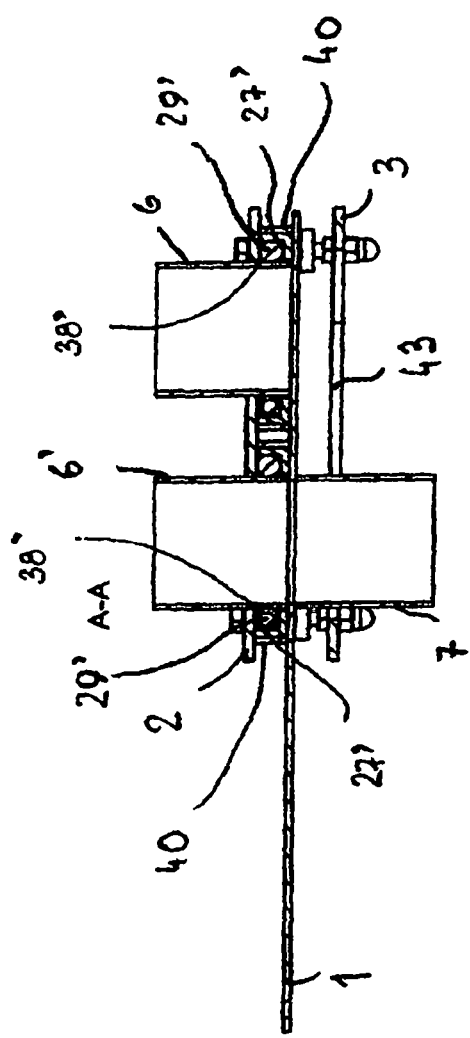
Figure 13:
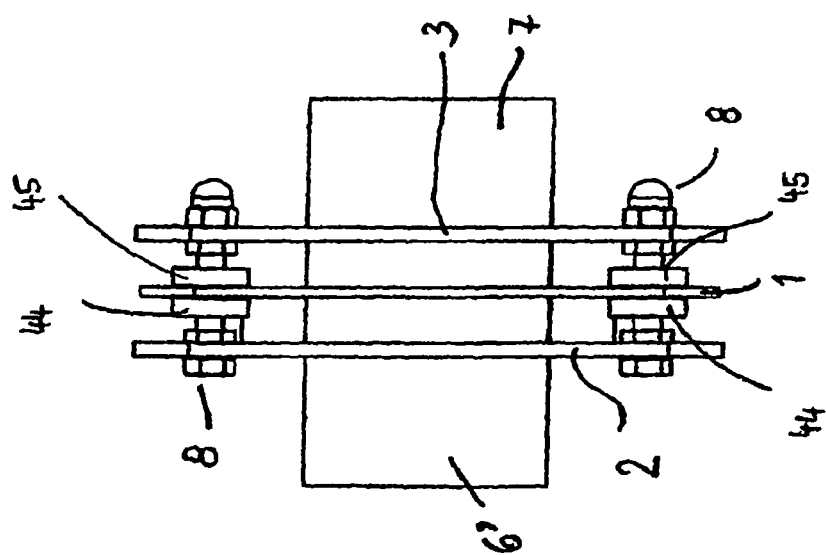
Figure 14:
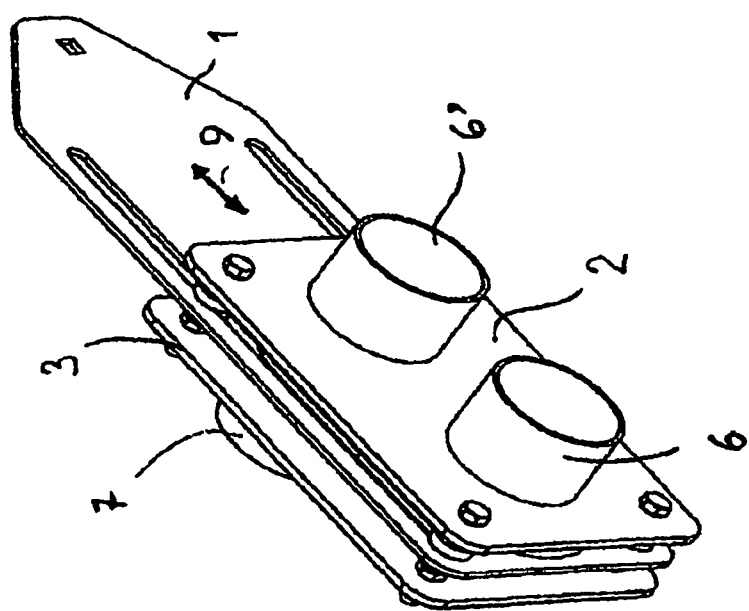

In the representations according to FIG. 11 to 15, the slide 1 is shifted so far that the in FIG. 11 two right spacers 8 lie against the right edge of the slots 14, 15. In this position, the pipe sections 6' and 7 are connected to one another so that the material fed in via the conveying line of the pipe section 7 is conveyed into the line that is connected to the pipe section 6'.

If the material is to be conveyed into the line that is connected to the pipe section 6, the slide 1 is shifted in shifting direction 9 (FIG. 11) towards the right so far that the in FIG. 11 two left spacers 8 come to lie against the left edge of the slots 14, 15. Then, the two pipe sections 6, 7 are flow-connected to one another so that the fed-in material is conveyed via the pipe section 6 and the conveying line connected thereto.

Since the slide 1 is provided with the pipe section 7 that is connected to it in a pressure-tight manner, the sealing rings 27' are adequate for sealing. The function corresponds to the embodiment according to FIG. 6 to 10. The pressure that is created during the pressure conveying in the respective pipe section 6, 6' enters the receiving space 38' receiving the positioning rings 29', as a result of which the sealing ring 27' is firmly pressed against the slide 1 and the inner wall of the support rings 40.

In the case of the described exemplary embodiment, the material to be conveyed is fed in each case via the line that is connected to the pipe section 7. However it is also possible that the material to be conveyed is fed in via one of the pipe sections 6, 6' or the line that is connected thereto. In this case, the material to be conveyed is conveyed to the respective recipient via the line that is connected to the pipe section 7 of the slide 1, which for example can be a processing machine.

Figure 15:
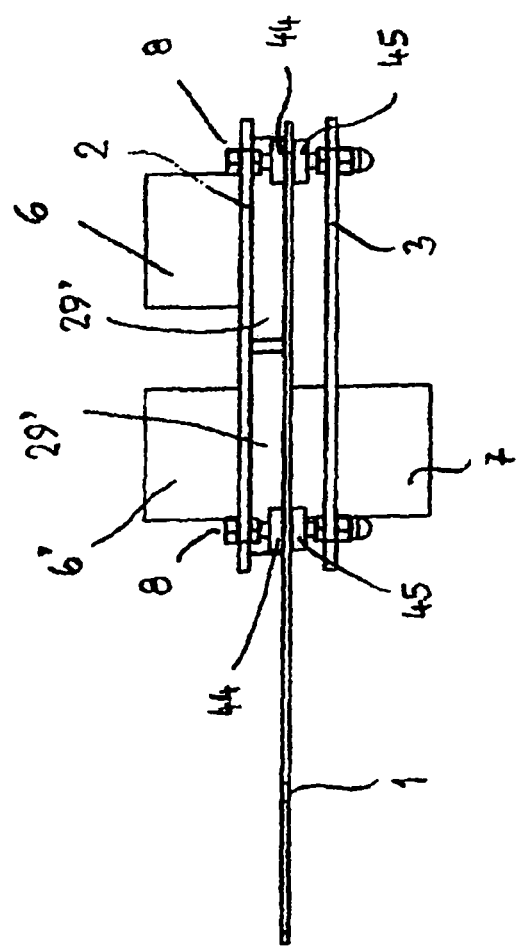

As is evident from FIG. 15, the retaining plate 3 is not absolutely essential for the function of the slide valve. The slide 1 is guided between two nuts 44, 45 each which are screwed onto the screw of the spacer 8. In this case, the slide 1 in the respective end position strikes the screws of the spacer 8 with the ends of its slots 14, 15. The use of the retaining plate 3 however has the advantage that it imparts greater stability and strength to the entire slide valve.

However, the slide valve can also be utilised in order to open the outlet end of containers or in order to seal the containers in a pressure-tight manner.

Figure 16:
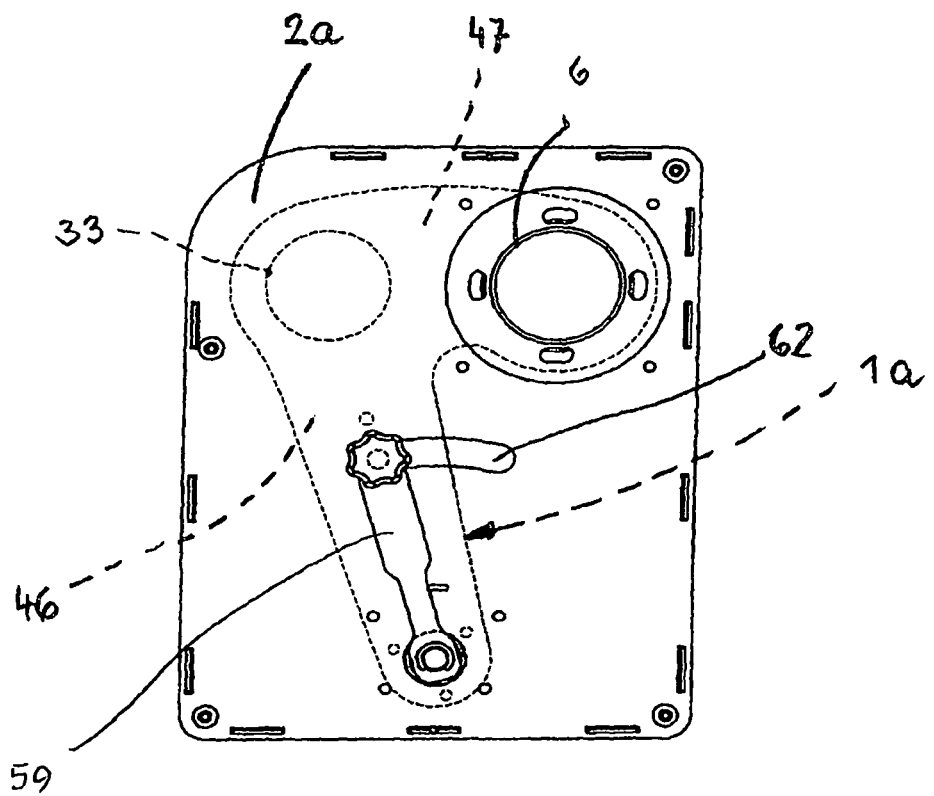

FIG. 16 to 18 show a further embodiment of a slide valve. The slide 1a in this embodiment is not shiftable but pivotably mounted between the two retaining plates 2a, 3a. FIG. 16 shows the slide 1a in the closing position and FIG. 17 in the opening position. The slide 1a has an approximate L-shape with a long leg 46 and a short leg 47. Near the free end of the longer leg 46 the slide 1a is fastened on an axis 48 which extends perpendicularly to the two retaining plates 2a, 3a and is rotatably mounted in openings 49, 50 of the two retaining plates 2a, 3a.

As is evident from FIG. 18, the axis 48 has two axis parts 48, 48b which are aligned with one another, which slightly project through the openings 49, 50. The axis part 48a is locked against axial shifting by way of a locking ring 51. The locking ring 51 lies against the inside of the retaining plate 2a facing the retaining plate 3a. In the region between the two retaining plates 2a, 3a, the two axis parts 48a, 48b are connected to one another in a rotationally fixed manner.

With a radial ring shoulder 52, the axis part 48b lies against the inside of the retaining plate 3a facing the retaining plate 2a and with an end section 53 tapered in the outer diameter slightly projects through the opening to the outside.

The end of the axis part 48b facing the axis part 48a comprises a ring flange 54 which radially extends to the outside, which is advantageously formed in one piece with the axis part 48b. The leg 46 of the slide 1a lies flat against the side of the ring flange 54 facing away from the retaining plate 2a. The leg 46 to this end is provided with a corresponding opening 54 through which the axis part 48b projects. The leg 46 of the slide 1a is detachably fastened to the ring flange 54. In the exemplary embodiment, the leg 46 is held on the ring flange 54 with screws 56. Advantageously, multiple screws 56 are provided over the circumference of the opening 55.

The end of the axis part 48a which projects through the opening 49 in the retaining plate 2a has an end section 57 that is tapered in diameter, which stands away from a ring shoulder 58. The one end of a flat lever 59, which sits on the axis 48 or the axis part 48a in a rotationally fixed manner, lies against the ring shoulder 58. The lever 59 is axially locked on the end section 57 by means of a locking ring 60. The lever 59 is thus held against axial shifting between the locking ring 60 and the ring shoulder 58.

The lever 59 is supported with little spacing on the outside of the retaining plate 2a facing away from the retaining plate 3a and at this end is securely connected to the leg 46 of the slide 1a. From the leg 46, a threaded bush 61 stands away perpendicularly, which projects through an arc-shaped slot 62 in the retaining plate 2a. The slots 62 lies on a circular arc about the axis of rotation of the slide 1a or its leg 46. In the threaded bush 61 a threaded pin 63 projects, which protrudes from the threaded bush 61 and carries a rotary handle 64, with which the threaded pin 63 can be screwed into the threaded bush 61. The rotary handle 64 comprises a face-end annular surface 65, with which it lies against the outside of the retaining plate 2a in a clamping position. The diameter of the annular surface 65 of the rotary handle 64 is greater than the width of the slot 62.

In the two end positions of the slide 1a (FIGS. 16 and 17), the threaded pin 63 is screwed into the threaded bush 61 by means of the rotary handle 64 so far that the annular surface 65 securely lies against the outside of the retaining plate 2a and thus clamps the slide 1a relative to the retaining plates 2a, 3a in the respective end position. In the opening position (FIG. 17), the threaded bush 61 lies against the one edge and in the closing position (FIG. 16) against the other edge of the arc-shaped slot 62. For pivoting the slide 1a, the rotary handle 64 is turned back slightly as a result of which the clamping between the rotary handle 64 and the retaining plate 2a is cancelled. The slide 1a can then be easily shifted into the respective position.

As is evident from FIGS. 16 and 17, the lever 59 extends at half width of the leg 46 of the slide 1a, seen in the direction of the pivot axis of the slide.

The leg 46 of the slide 1a merges arc-like into the short leg 47. In the transition region between the two legs is located the passage opening 33, which in the opening position according to FIG. 17 opens the passage between the two pipe sections 6, 7.

The two pipe sections 6, 7 are surrounded by the flat sealing rings 27, 28 which are supported on the two sides of the slide 1a and in the described manner seal the gaps 66, 67 (FIGS. 3 and 10) between the pipe sections 6, 7 and the slide 1a. Corresponding to the embodiment, the two sealing rings 27, 28 are formed according to FIG. 1 to 5. According to the embodiment, the material to be conveyed is conveyed with vacuum according to FIG. 1 to 5 so that the two sealing rings 27, 28 reliably seal the gaps 66, 67 between the slide 1a and the pipe sections 6, 7 because of the pressure differential between the pressure within the pipe sections 6, 7 and the ambient pressure.

The spacing between the two retaining plates 2a, 3a can be adjusted, as was explained by way of FIG. 1 to 5, in the described manner by means of the spacers 8 so that the sealing gaps 66, 67 between the pipe sections 6, 7 and the slide 1a are minimal.

The two sealing rings 27, 28, which in the manner described by way of FIG. 1 to 5 sealingly lie against the pipe sections 6, 7 and against the two outsides of the slide 1a, are advantageously positioned through the two positioning rings 29, 30 so that they always lie against the slide 1a. The two positioning rings 29, 30 surround the pipe sections with a spacing. The two positioning rings 29, 30 are secured against shifting in the direction of their axis between the two retaining plates 2a, 3a. Here, the positioning rings 29, 30 are designed so that the outside pressure can act on the sealing rings 27, 28. For example, the positioning rings 29, 30 can consist of air-permeable material, for example of foamed material.

The two retaining plates 2a, 3a in view each have an approximately rectangular outline and congruently lie on top of one another. One of the corners of the retaining plates 2a, 3a is rounded with a larger radius of curvature. The pipe sections 6, 7 are located near a corner region of the retaining plates 2a, 3a. They are designed so that the slide 1a in its blocking position (FIG. 16) lies completely between the two retaining plates 2a, 3a and not protrudes over these. In the opening position, by contrast, the short leg 47 of the slide 1a protrudes over the two retaining plates 2a, 3a (FIG. 17). Since the opening position and the closing position of the slide 1a is determined by the stop position of the threaded bush 61 on the two ends of the slot 62, a simple yet precise adjustment of the slide in both end positions is ensured.

The short leg 47 of the slide 1a is configured so that during the pivoting it always closes the passage of the two pipe sections 6, 7 opening these only when the passage opening 33 enters the region of the pipe sections 6, 7.

The lever 59 ensures that the slide 1a can be pivoted without major expenditure of force.

The slide valve according to FIG. 16 to 18 cane also be utilised for pressure conveying as was described by way of FIG. 6 to 10. In this case, the sealing rings 27, 28 have the cross-sectional shape described by way of FIG. 6 to 10.

What is claimed is:

1. A slide valve for a conveying system with a conveying line (6, 6', 7) conveying under a vacuum, the slide valve comprising:
    at least one slide (1, 1a), arranged at a conveying cross section of the conveying line and configured to close off the conveying cross section, wherein the at least one slide (1, 1a) comprises at least one passage opening (33);
    at least one sealing ring (27, 28; 27', 28') configured to seal a gap between the conveying line (6, 6', 7) and the at least one slide (1, 1a), wherein the at least one sealing ring (27, 28; 27', 28') surrounds the conveying line (6, 6', 7) and comprises a washer-like sealing part which lies flat against the at least one slide (1a, 1a) and rests against a circumference of the conveying line;
    wherein a side of the washer-like sealing part facing away from the at least one slide (1, 1a) is subjected to an ambient pressure;
    wherein a pressure differential is produced between the ambient pressure and a pressure existing in the conveying line when conveying under vacuum, wherein the ambient pressure is greater than the pressure in the conveying line when conveying under vacuum;
    wherein the washer-like sealing part is supported loosely without sealing on the at least one slide when no conveying under vacuum takes place;
    wherein the washer-like sealing part seals the gap between the conveying line and the at least one slide only once a vacuum conveying action begins and the pressure differential forces the washer-like sealing part into a sealing position at the gap.

2. The slide valve according to claim 1, characterized in that the at least one slide (1, 1a) lies between two retaining plates (2, 3; 2a, 3a), wherein each one of the two retaining plates is spaced from the at least one slide (1, 1a).

3. The slide valve according to claim 1, characterized in that two of the at least one sealing ring (27, 28' 27', 28') with the washer-like sealing part are provided and lie against opposite sides of the at least one slide (1, 1a).

4. The slide valve according to claim 2, characterized in that the two retaining plates (2, 3) are held spaced from one another by spacers (8), which penetrate slots (14, 15) of the at least one slide (1) extending in a shifting direction (9) of the at least one slide (1).

5. The slide valve according to claim 2, characterized in that at least one of the two retaining plates (2, 3, 2a, 3a) comprises at least one pipe section (6, 6', 7), wherein the at least one pipe section is part of the conveying line and projects through an opening (4, 5) of the at least one of the two retaining plates (2, 3, 2a, 3a).

6. The slide valve according to claim 1, characterized in that the at least one sealing ring (27, 28', 27', 28) is held in an installation position through at least one positioning ring (29, 30; 29', 30').

7. The slide valve according to claim 6, characterized in that the positioning ring (29, 39; 29', 30') has a circular cross section.

8. The slide valve according to claim 1, characterized in that a retaining plate (2) comprises at least two pipe sections (6, 6') which are arranged in a shifting direction (9) of the slide (1) spaced one behind the other and the slide (1) comprises at least one pipe section (7), which by shifting the slide (1) can be optionally connected to one of the pipe sections (6, 6') of the retaining plate (2).

9. The slide valve according to claim 1, characterized in that the slide (1a) is pivotably mounted between two retaining plates (2a, 3a).

10. The slide valve according to claim 9, characterized in that the slide (1a) is approximately formed L-shaped.

11. The slide valve according to claim 10, characterized in that the slide (1a) with its longer leg (46) is pivotably mounted.

12. The slide valve according to claim 9, characterized in that the slide (1a) is pivotable with at least one actuating part (59, 61, 63, 64).

13. The slide valve according to claim 12, characterized in that the actuating part (59, 61, 63, 64) projects through a slot (62) which is provided in at least one of the two retaining plates (2a, 3a), wherein the slot (62) extends curved about the pivot axis (48) of the slide (1a).

14. The slide valve according to claim 12, characterized in that the actuating part (59, 61, 63, 64) comprises a clamping element (64) with which the actuating part (59, 61, 63) in the respective adjusting position of the slide (1a) can be clamped on at least one of the two retaining plates (2a, 3a).

15. The slide valve according to claim 1, characterized in that two of the at least one sealing ring with the washer-like sealing part are provided at opposite sides of the at least one slide and seal the gaps (66, 67).

16. The slide valve according to claim 14, wherein the clamping element (64) is a rotary handle.

17. A slide valve for a conveying system with a conveying line (6, 6', 7) under a pressure, the slide valve comprising:
    at least one slide (1, 1a), arranged at a conveying cross section of the conveying line and configured to close off the conveying cross section, wherein the at least one slide (1, 1*a*) comprises at least one passage opening (33);

at least one sealing ring (27, 28; 27', 28'), with which the conveying line (6, 6', 7) is sealed against the at least one slide (1, 1*a*);

wherein the at least one sealing ring (27, 28; 27', 28') surrounds the conveying line (6, 6', 7) and has an L-shaped cross section;

wherein one leg (34, 35) of the L-shaped cross section forms a washer-like sealing part which lies flat against the at least one slide (1*a*, 1*a*) and is radially spaced from the conveying line;

wherein the other leg (36, 37) of the L-shaped cross section extends cylindrically and delimits a receiving space (38, 39), wherein the receiving space is closed off relative to the ambient and is connected through a gap (66, 67) to an interior of the conveying line; and wherein the at least one sealing ring seals against the at least one slide (1) by the pressure of the conveying line, acting in the receiving space through the gap.

18. The slide valve according to claim 17, characterized in that the other leg (36, 37) of the L-shaped cross section of the at least one sealing ring (27', 28') comprises an outer cylindrical surface that lies against an inside of a support ring (40, 41) surrounding the at least one sealing ring (27', 28').

19. The slide valve according to claim 17, characterized in that the receiving space (38, 39) is further delimited by at least one retaining plate (2, 3) and at least one pipe section (6, 6', 7) of the conveying line.

20. The slide valve according to claim 18, characterized in that, for pressure conveying, the pressure that is present in the conveying line (6, 6', 7) presses the at least one sealing ring (27', 28') against the at least one slide (1) and against the support ring (40, 41).

21. The slide valve according to claim 19, characterized in that in the receiving space (38, 39) of the at least one sealing ring (27', 28') a positioning ring (29' 30') is accommodated.

22. The slide valve according to claim 21, characterized in that the positioning ring (29', 30') is permeable to a pressure medium.

23. The slide valve according to claim 21, characterized in that the positioning ring (29', 30') comprises at least one passage (42).

24. The slide valve according to claim 23, characterized in that a plurality of the at least one passage (42) are provided and arranged distributed over a circumference of the positioning ring.

* * * * *